US006866292B2

(12) United States Patent
Thomas

(10) Patent No.: US 6,866,292 B2
(45) Date of Patent: Mar. 15, 2005

(54) AUTOMOTIVE VEHICLE AIR BAG SYSTEM

(75) Inventor: Scott David Thomas, Novi, MI (US)

(73) Assignee: General Motors Corporation, Detroit, MI (US)

( * ) Notice: Subject to any disclaimer, the term of this patent is extended or adjusted under 35 U.S.C. 154(b) by 25 days.

(21) Appl. No.: 10/176,540

(22) Filed: Jun. 21, 2002

(65) Prior Publication Data

US 2003/0234522 A1 Dec. 25, 2003

(51) Int. Cl.$^7$ .............................................. B60R 21/22
(52) U.S. Cl. .................................................. 280/730.2
(58) Field of Search ........................ 280/730.2, 728.2, 280/743.2

(56) References Cited

U.S. PATENT DOCUMENTS

| | | | | |
|---|---|---|---|---|
| 5,033,236 A | * | 7/1991 | Szerdahelyi et al. | 49/502 |
| 5,308,112 A | * | 5/1994 | Hill et al. | 280/730.2 |
| 5,913,536 A | * | 6/1999 | Brown | 280/730.2 |
| 6,164,688 A | * | 12/2000 | Einsiedel et al. | 280/730.2 |
| 6,224,089 B1 | * | 5/2001 | Uchiyama et al. | 280/728.2 |
| 6,237,940 B1 | * | 5/2001 | Shirk et al. | 280/730.2 |
| 6,296,274 B1 | * | 10/2001 | Stevens et al. | 280/741 |
| 6,412,810 B1 | * | 7/2002 | Wipasuramonton et al. | 280/730.2 |
| 6,428,036 B1 | * | 8/2002 | Mramor et al. | 280/728.2 |
| 2003/0030257 A1 | * | 2/2003 | Thomas et al. | 280/730.2 |

FOREIGN PATENT DOCUMENTS

| | | | | |
|---|---|---|---|---|
| DE | 199550233 A1 | * | 5/2000 | B60R/21/22 |
| DE | 10033319 A1 | * | 1/2002 | B60R/21/22 |
| DE | 10211061 A1 | * | 10/2002 | B60R/21/22 |
| JP | 2002029359 A | * | 1/2002 | B60R/21/22 |
| JP | 2002321587 A | * | 11/2002 | B60R/21/22 |

* cited by examiner

Primary Examiner—Son T. Nguyen
(74) Attorney, Agent, or Firm—Laura C. Hargitt

(57) ABSTRACT

The present invention is for a vehicle having a passenger air bag system for frontal impact restraint packaged within the passenger vehicle door. The air bag system includes a gas emitting inflator for emitting inflation gas upon receiving a signal of a frontal impact, a fill tube having a first, fill end in fluid communication with the inflator to port the inflation gas from the inflator, and an air bag module in fluid communication with the fill tube and having an air bag cushion packed therein to receive the inflation gas from the fill tube and deployable in the interior space forward of the passenger seat upon the frontal impact.

5 Claims, 13 Drawing Sheets

US 6,866,292 B2

AUTOMOTIVE VEHICLE AIR BAG SYSTEM

TECHNICAL FIELD

The present invention is for a frontal passenger air bag system installed in an automotive vehicle door.

BACKGROUND OF THE INVENTION

Air bags are a known safety device installed in passenger vehicles today. For supplemental occupant protection during a frontal collision, frontal air bags are traditionally installed in the hub of the steering wheel for the driver and in a recess of the instrument panel for the front seat passenger. This allows the air bags to fill the space between the occupant and the front interior of the vehicle upon deployment in a frontal collision.

Frontal passenger air bag modules are relatively large and may drive larger than desired instrument panels from an interior volume stand point. Vehicle designers are exploring ways to provide more interior space for the passengers. One means is to design an "open cockpit", which could benefit from packaging the frontal passenger air bag in a non-traditional location that is not within the instrument panel.

SUMMARY OF THE INVENTION

The present invention is for a frontal passenger air bag system installed in a vehicle door adjacent the seating location of the passenger. The air bag system provides protection to a passenger in the event of a frontal collision by deploying an air bag stored in the vehicle door to fill the space between the passenger and the vehicle interior components forward of the passenger.

The passenger air bag system packaged within the vehicle door includes a gas emitting inflator for emitting inflation gas upon receiving a signal of a frontal impact, a fill tube having a first, fill end in fluid communication with the inflator to port the inflation gas from the inflator, and an air bag module in fluid communication with the fill tube and having an air bag cushion packed therein to receive the inflation gas from the fill tube. The air bag cushion is deployable in the interior space forward of the passenger seat upon the frontal impact. Importantly the entire frontal passenger air bag system, as defined, is packaged in the vehicle door.

Several internal configurations may be used for the door mounted passenger air bag module. Each approach solves the dilemma of how to redirect inflation gas that is being transported in a rearward direction inside the fill tube so that it has a forward and somewhat inboard trajectory as it fills the cushion. In one preferred embodiment the air bag system further includes a diffuser to redirect the inflation gas trajectory delivered from the fill tube to the air bag cushion. In a second embodiment the fill tube is curved approximately 180 degrees to redirect the inflation gas.

DESCRIPTION OF THE PREFERRED EMBODIMENT

Figure 1A:
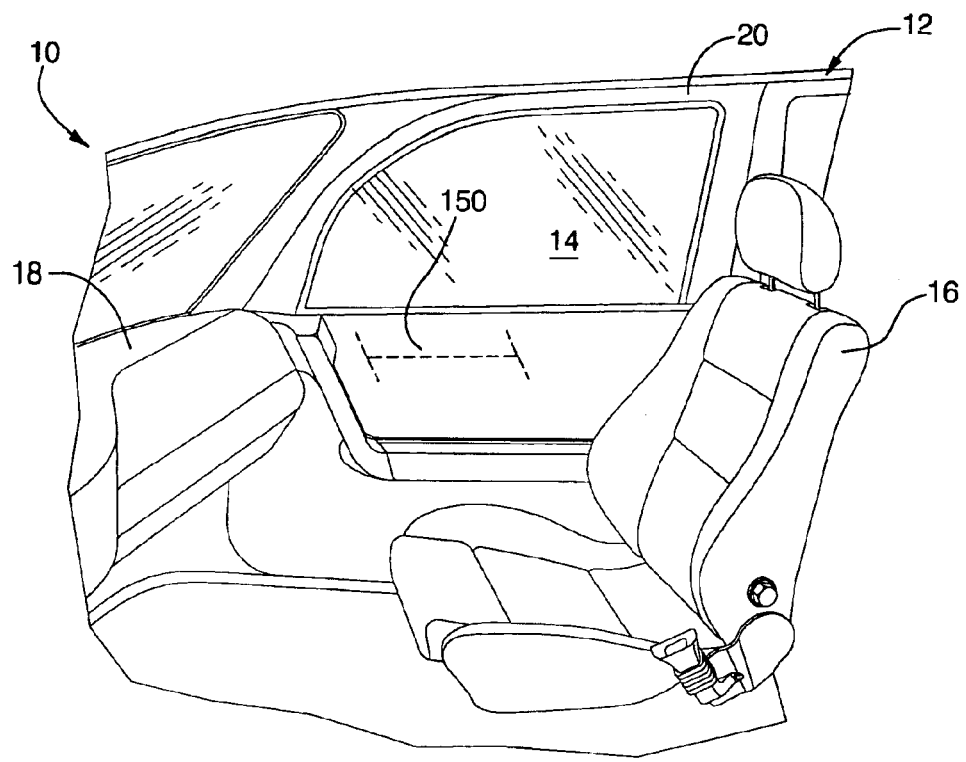
FIG. 1A is a schematic view of the interior of a vehicle.

FIG. 1A illustrates a vehicle 10 having a vehicle body 12 defining a vehicle interior space 14. Located within the interior space 14 are a driver seat, not shown, a passenger seat 16, and an instrument panel 18 forward of the seats. A steering wheel (not shown) is forward of the driver seat in the instrument panel. Side openings in the vehicle body are closed by a driver side vehicle door (not shown) and a passenger side vehicle door 20.

The present invention is for a frontal passenger air bag system 22, which operates to deploy during a frontal impact. The frontal passenger air bag system 22 is uniquely packaged within the passenger side vehicle door 20.

Figure 1B:
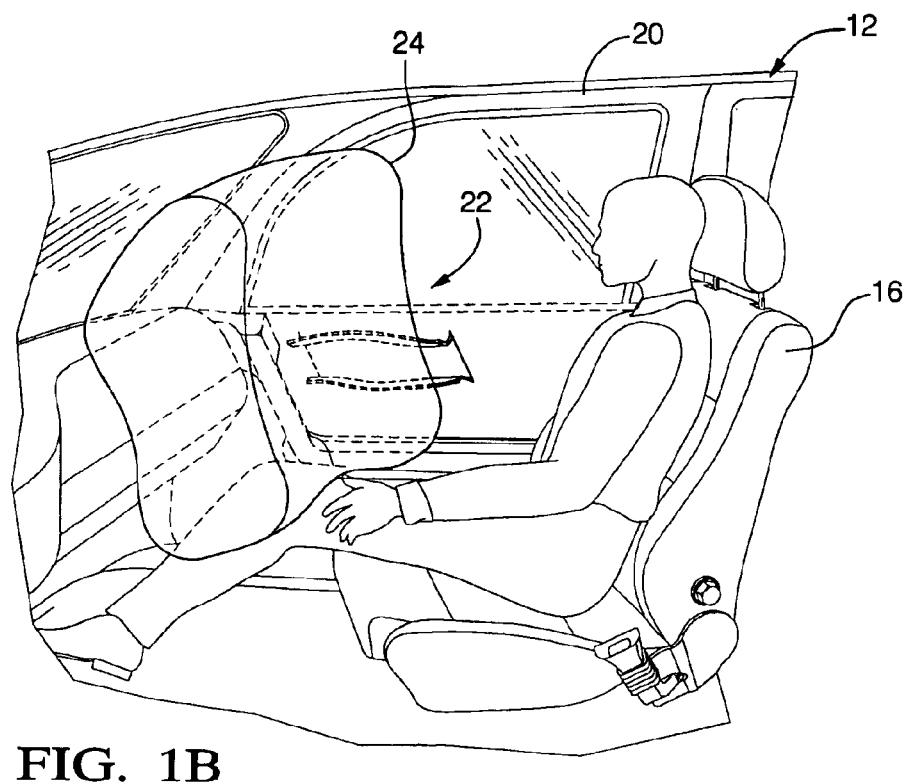
FIG. 1B is a schematic view of the interior of the vehicle with an air bag cushion of the present invention deployed.

During a frontal collision of sufficient severity to warrant air bag deployment, a remotely located sensing system sends a signal to the frontal air bag system to deploy the cushion. During deployment, schematically illustrated in FIG. 1B, an air bag cushion 24 deploys out of the passenger side vehicle door 20 and fills the interior volume 14 rearward of the instrument panel 18 and forward of the passenger, thus providing an inflated cushion 24 to restrain the passenger in a frontal impact. It is preferred that the cushion deploys into this space with minimal interaction with the passenger. Thus a frontal air bag system 22, which inflates and directs the cushion 24 in a forward and somewhat inboard trajectory is desired. The frontal air bag system will now be described in greater detail.

Figure 2:
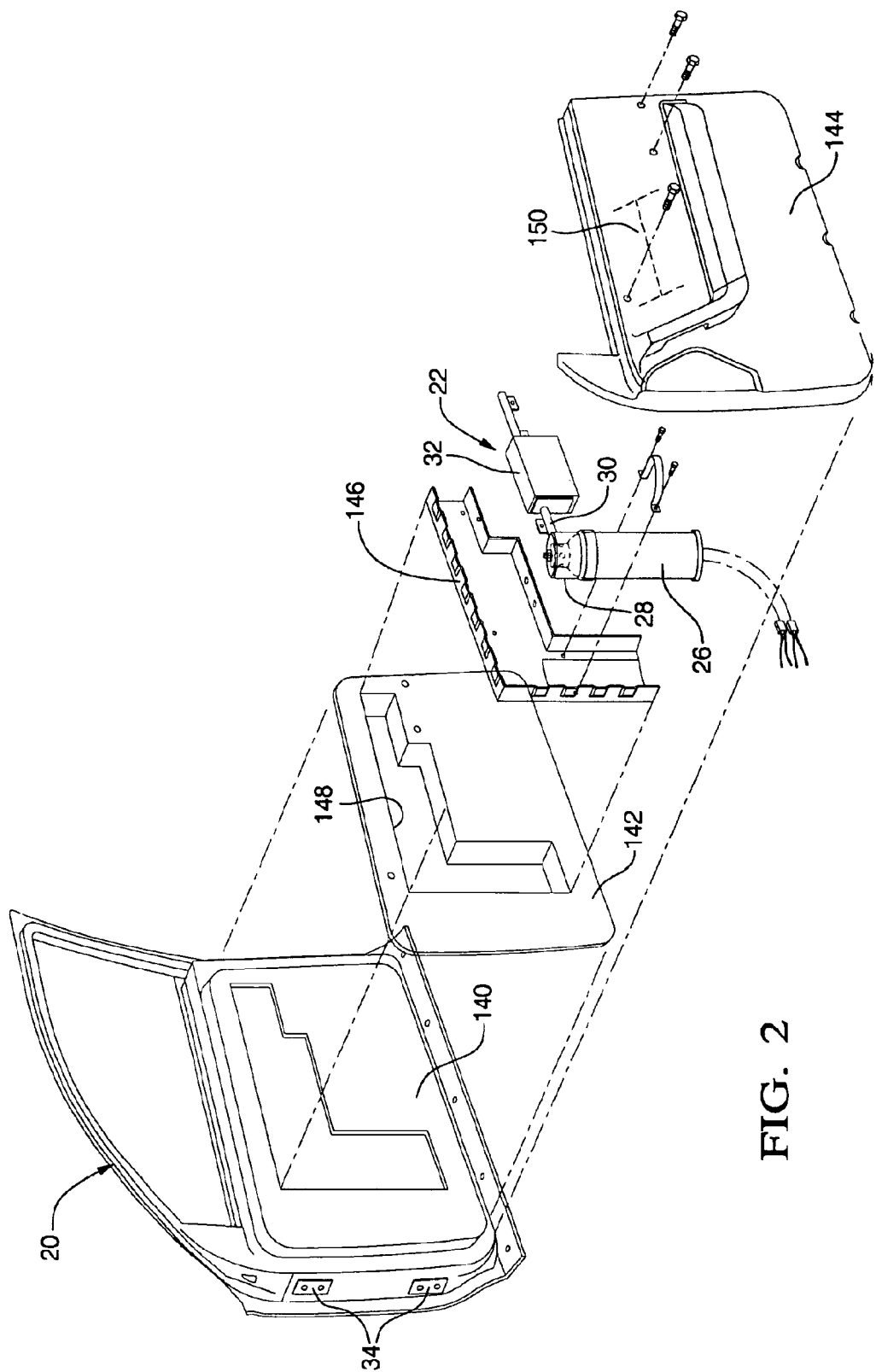
FIG. 2 is an expanded view of the passenger side vehicle door with the frontal air bag system of the present invention.
Figure 3A:
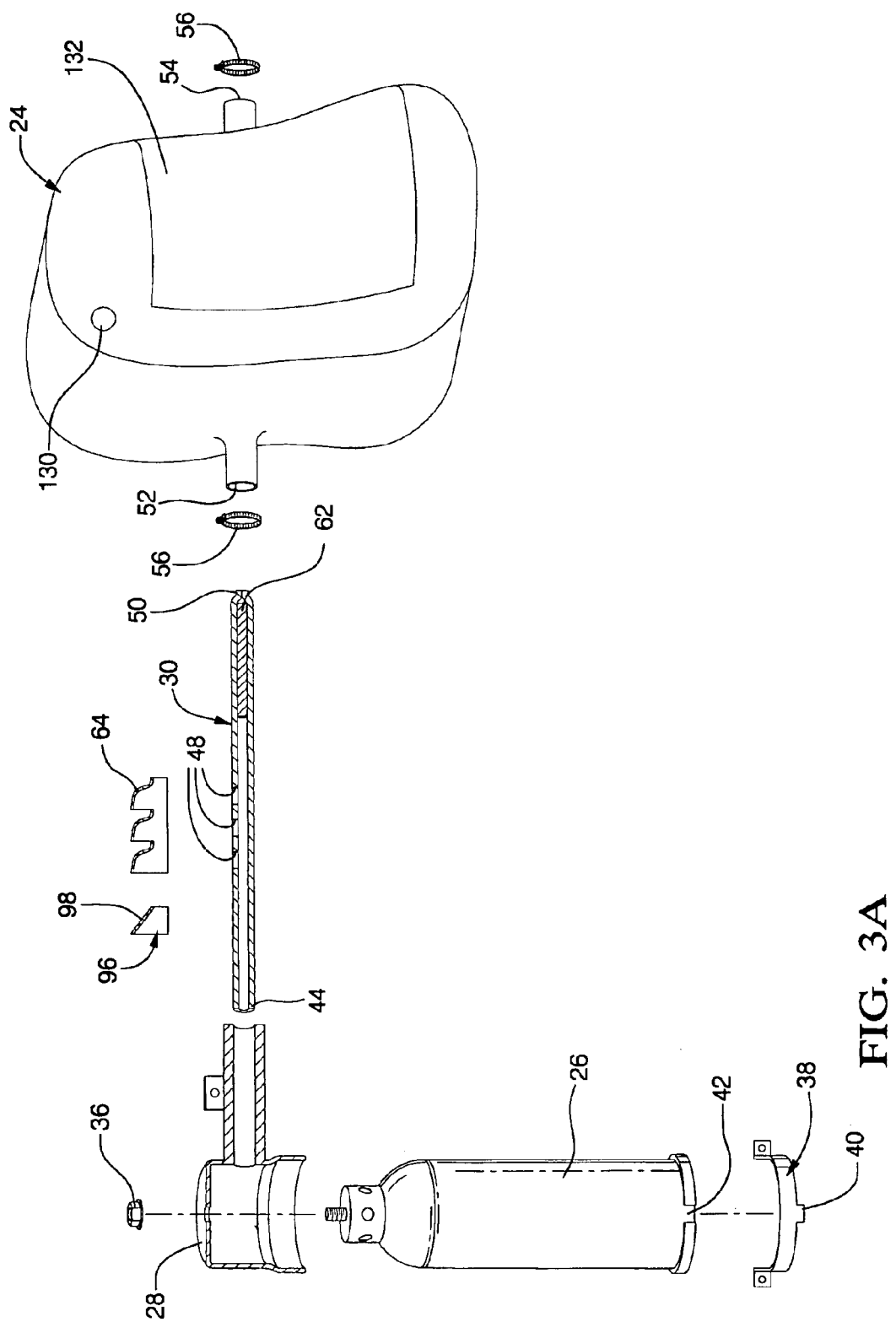
FIG. 3A is an expanded view of the frontal air bag system.

The expanded views of FIGS. 2 and 3A illustrate the components of the frontal air bag system 22. The system 22 includes a gas emitting inflator 26, which is in signaling communication with a triggering sensor (not shown) for sensing a frontal vehicle impact of predetermined severity. The gas emitting inflator 26 emits inflation gas upon receiving such a signal of a frontal impact. The gas is expelled into a plenum 28 and delivered through a fill tube 30 to an air bag module 32. The air bag module 32 includes the cushion 24 folded and packed within.

As shown in FIG. 2, the passenger side door 20 packages the frontal air bag system 22. The relative locations of components will be described with reference to vehicle directions i.e. forward refers to forward in vehicle. The inflator 26 is packaged preferably in a forward portion of the door 20 to support the mass of the inflator closer to the door hinges 34. This location also minimizes possible interaction between the passenger and the typically hard structure of the inflator. The air bag module 32 is packaged rearward of the inflator 26 in the door 20, thus necessitating the fill tube 30 to port gas therebetween.

The inflator 26 is installed into the plenum 28 and may be attached directly to the plenum by a nut 36 as shown in FIG. 3A. Additionally, a snap-on bracket 38 with a locating feature 40 to mate with a corresponding locating feature 42 on the inflator 26 may also be used. The plenum may be cast, stamped, or molded out of a metallic or aluminum material, or may be several pieces welded together. Alternatively, the plenum may be a flexible tube having threaded ends to mate to the inflator and the fill tube.

The plenum 28 maybe configured to accept an inflator 26 that outputs inflator gas at one end during deployment, as illustrated or an inflator that outputs gas radially about its mid-section.

Figure 4:
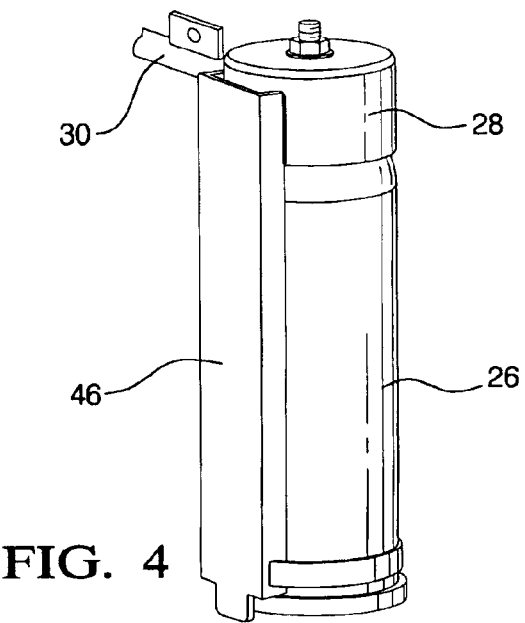
FIG. 4 illustrates a plenum to inflator reinforcement.

It may be necessary to reinforce the inflator 26 along its length so that a shear force does not cause the attachment between the inflator and plenum to deform. As shown in FIG. 4, a plenum reinforcement 46 may be welded on to the plenum 28 or made integral to the plenum, to minimize relative displacement between the plenum and inflator.

The fill tube 30 transports inflator gas directly from the inflator 26 or plenum 28 to the air bag module 32. The fill tube 30 as shown in FIG. 3A is a relatively straight tube having a plurality of radial openings 48 along its length. A first fill end 44 of the fill tube 30 is attached to the plenum 28. The attachment scheme may include a threaded, welded, brazed, or snap in joint likely with a secondary piece that is snapped into place to hold the plenum and fill tube together. A second end 50 of the tube is closed, such as by a weld, cap, or plug.

Figure 5A:
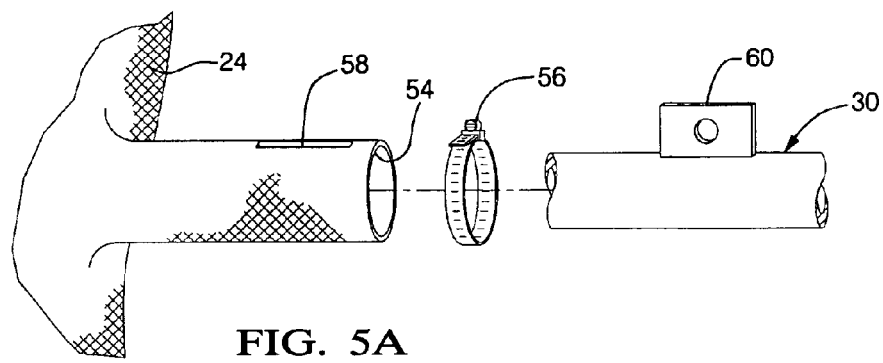
FIGS. 5A–B illustrate a cushion to fill tube attachment.
Figure 5B:
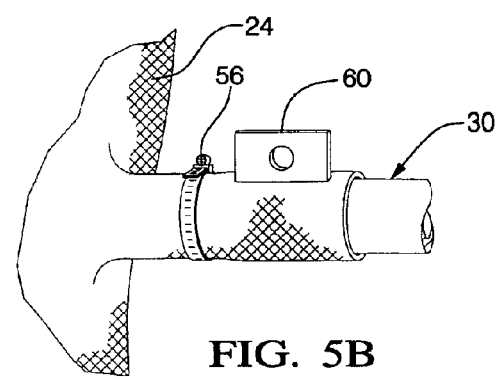

The fill tube 30 is slipped into a first fill tube opening 52 in the cushion 24, extends through the cushion, and out a second fill tube opening 54 in the cushion. The cushion 24 is attached to the fill tube 30 with clamps 56 at each of the fill tube openings 52,54. As shown in FIGS. 5A–B, the fill tube 30 and the cushion 24 may have complimentary locators to assist in proper assembly. The locators may include a female slot 58 on the cushion 24 and a corresponding male shaped protrusion 60 on the fill tube 30, which are mated together during assembly. The protrusion 60 may also operate as an attachment feature for the fill tube to other structure. The clamps 56 would then be tightened to attach the cushion 24 to the fill tube 30.

To prevent inflator gases from traveling downstream in the fill tube 30 beyond the radial openings 48, as shown in FIG. 3A, an optional flow blocker 62 may be included inside the fill tube 30. The flow blocker 62 may take the form of a plug or could be welded into place.

Gas flows through the generally straight fill tube 30 in a rearward direction from the plenum 28. To modify the trajectory of the gas as it exits the radial openings 48 in the fill tube 30, a diffuser 64 may be included in the air bag system 22.

Figure 6A:
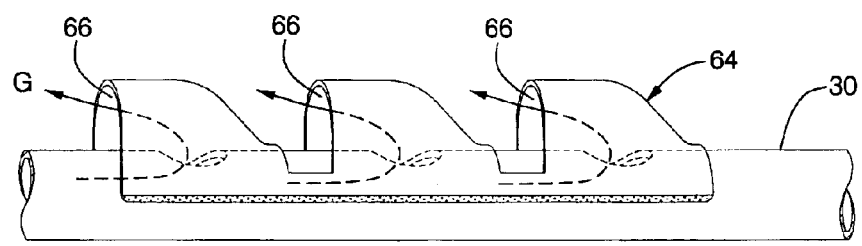
FIG. 6A illustrates a rigid diffuser attached to the fill tube.
Figure 6B:
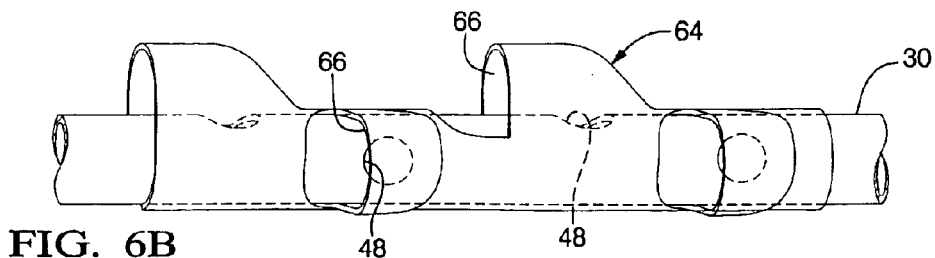
FIG. 6B illustrates a variation of the rigid diffuser.

In a first embodiment shown in FIG. 6, a rigid metallic diffuser 64 is welded to the outer surface of the fill tube 30. The diffuser 64 includes a nozzle or port 66 to align with each of the radial openings 48 in the fill tube 30. The nozzles or ports 66 are directed generally forward to redirect the inflation gas trajectory. As shown, the nozzles 66 are angled forward more than ninety degrees from the rearward, fill tube gas flow direction. The diffuser 64 is oriented inside the cushion 24 so that the inflator gases, shown by arrow G, can be directed into the cushion in a generally forward direction. As shown in FIG. 6B, the diffuser ports 66 are aligned with radial openings 48 on both the top and inboard side of the fill tube 30.

Figure 7:
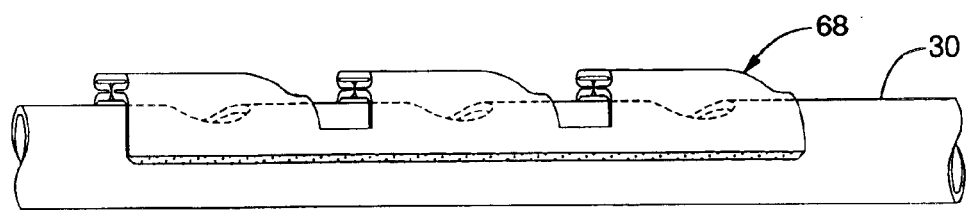
FIG. 7 illustrates an expandable diffuser.

The metallic diffuser can be rigid, as shown in FIG. 6A or can be expandable from an initial collapsed position as shown in FIG. 7. The expandable diffuser 68 expands by the high pressure inflator gases as they escape out the radial openings 48 in the fill tube 30.

Figure 8B:
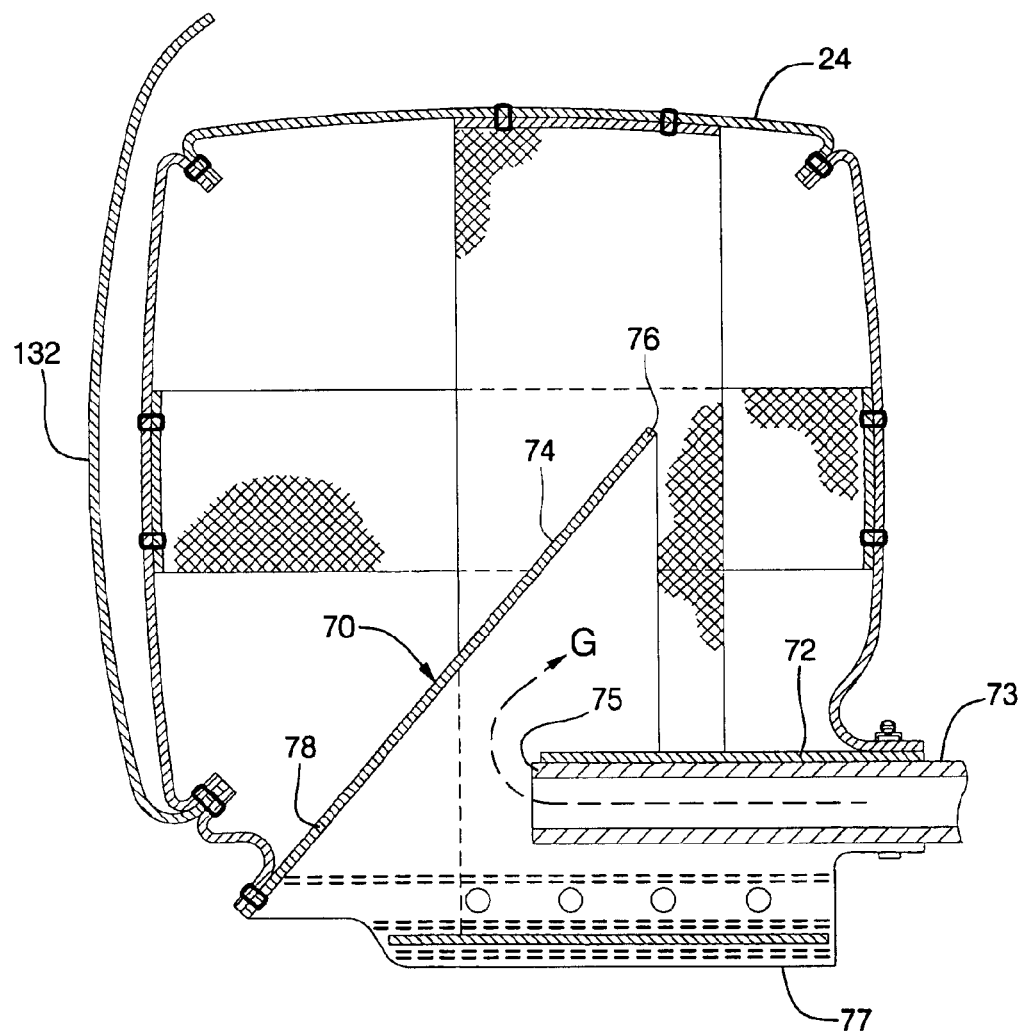
FIG. 8B is a cross section illustrating a deployed cushion using the fabric diffuser of FIG. 8B.
Figure 8A:
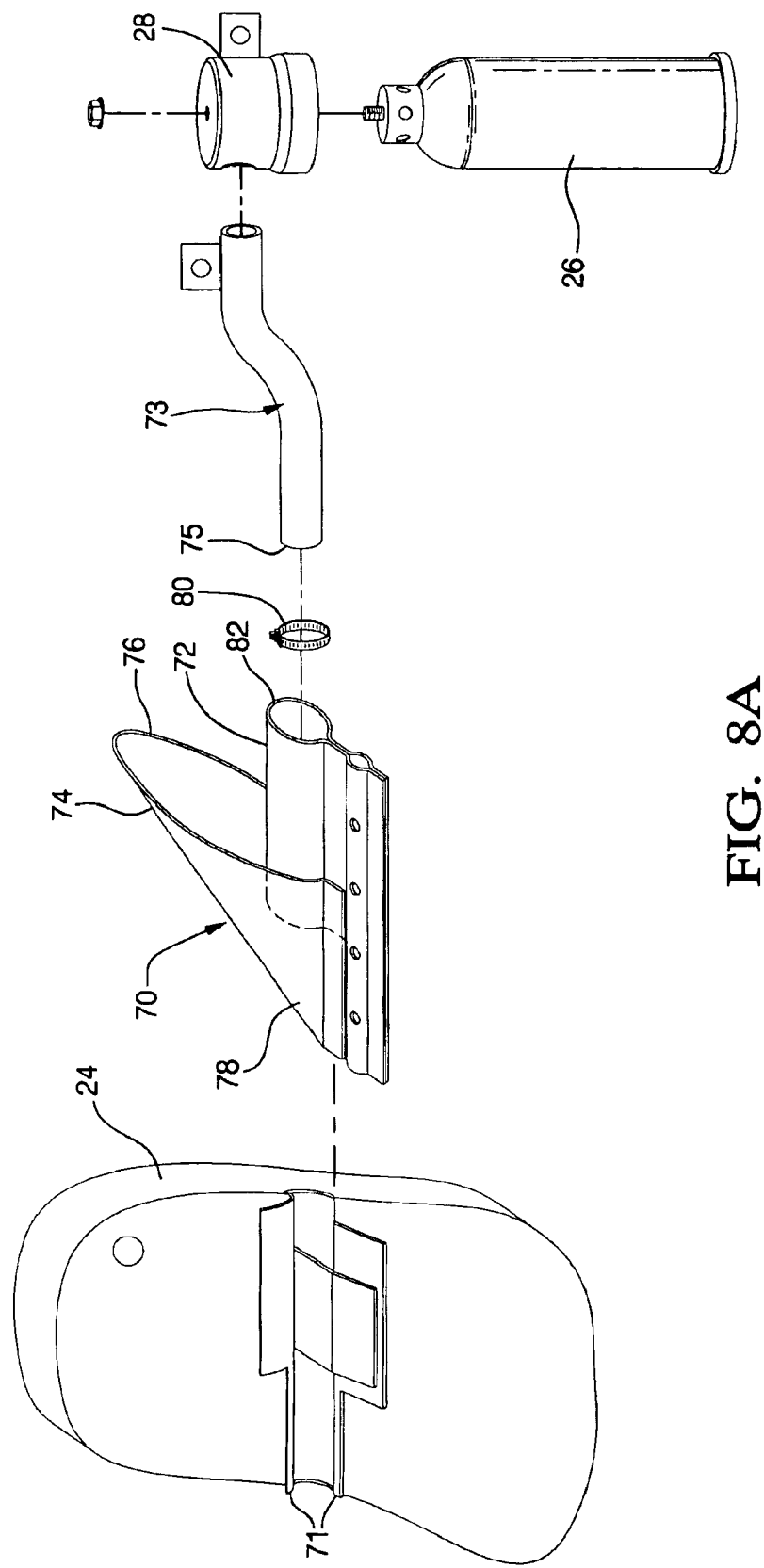
FIG. 8A is an expanded view of a frontal air bag system including a fabric diffuser.

In a further variation shown in FIGS. 8A,B, a flexible fabric diffuser 70 is employed. The fabric diffuser 70 includes a cylindrical support 72 to carry a portion of a fill tube 73. The fabric diffuser 70 also includes a conical diffuser portion 74, adjacent the cylindrical support 72, and in which a second open end 75 of the fill tube 73 is disposed. The open large diameter end 76 of the conical diffuser 74 is forward of its closed pointed end 78. In this case, the fill tube 73 has no radial openings, but instead the second end 75 of the tube is open to deliver gas therethrough. The second end 75 of the fill tube is inserted in the cylindrical support 72 to be carried therein. A clamp 80 is used to attach the fill tube 73 to the first end 82 of the cylindrical support 72 and the cushion 24. The fabric diffuser 70 may be sewn to cushion outer panel 71 at location 77. The fabric diffuser 70 is folded inside the cushion pack. The fabric diffuser may be made out of a nylon or polyester fabric with a silicone or other material coating on it.

With this fabric diffuser 70 and open ended fill tube 73, the inflator gases, shown by arrow G in FIG. 8B, travel through the fill tube, exiting the open second end 75. The inflation gas opens and expands the adjacent, conical diffuser portion 74, which then directs the gas forward into the cushion 24 upon deployment.

FIG. 9 illustrates another means to solve the issue of redirecting the rearward gas flow direction. In this case a fill tube 86 includes a straight portion 88 having one or more radial openings 90 as previously described. The fill tube 86 also has a curved portion 92 upstream of the straight portion 88 for changing the direction of the inflation gas. The curved portion 92 is essentially a bent C-shape that turns the inflator gas nearly 180 degrees as the gas flows inside the fill tube 86 from the inflator 26.

Figure 9A:
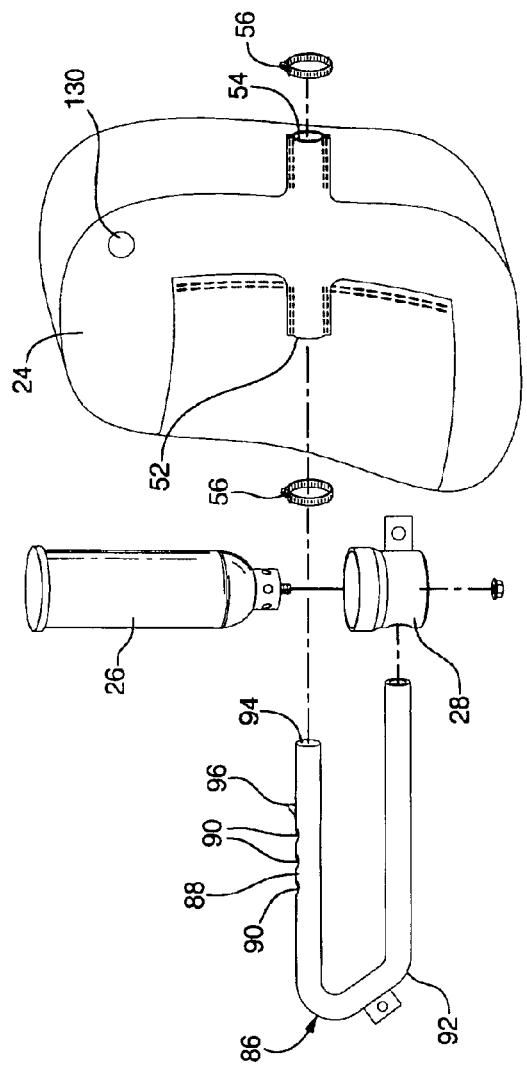
FIG. 9A is an expanded view of a frontal air bag system including a curved fill tube.
Figure 9B:
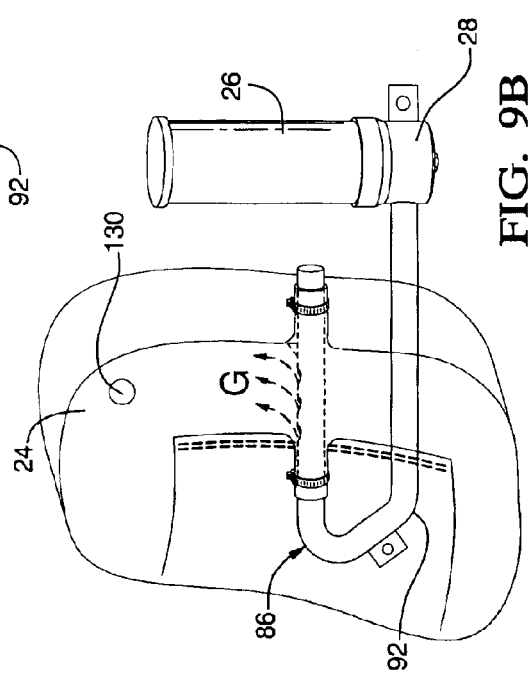
FIG. 9B is a deployed cushion using the curved fill tube of FIG. 9A.

The straight portion 88 of the fill tube 86 is slipped into the first fill tube opening 52 of the cushion, through the cushion 24 and out the second fill tube opening 54. The cushion 24 is attached to the fill tube 86 with clamps 56 at the two fill tube openings 52,54. Here the second end 94 of the fill tube extends through the cushion 24 as shown in FIGS. 9A,B, in which case the second end would be closed. Alternatively, the second end may be disposed inside the cushion, in which case the second end may be open as an outlet for gas or may be closed. If the end is open, then the radial openings in the straight portion would be optional. With the curved fill tube, the inflator gases, shown by arrow G in FIG. 9B, may be directed into the cushion in a generally forward direction upon deployment.

To further direct the inflation gas in the cushion 24, and thus affect the direction the cushion deploys, an internal bag director 96 having a ramped surface 98 may be used. The bag director 96 may be a separate component welded to the fill tube adjacent the diffuser, shown in FIG. 3A, or may be integral to the rigid diffuser 64. The internal bag director may help direct the inflation of the cushion away from structure in the door and into the interior compartment of the vehicle.

Figure 10:
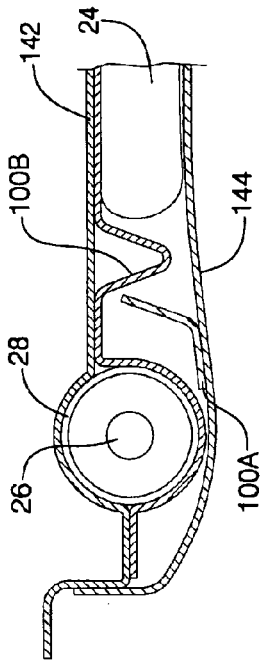
FIG. 10 is a plan view cross section illustrating external bag directors.

As a variation to the internal bag director, an external bag director 100 may be employed as in FIG. 10 to further direct the deployment direction of the cushion. The external bag director 100 provides a ramped reaction surface for the cushion as it deploys. The bag director may be located on the module housing like 100A or adjacent vehicle door structure like 100B.

Figure 11A:
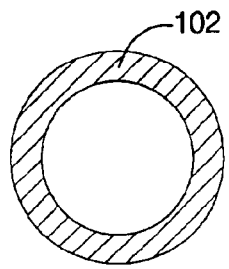
FIGS. 11A–D illustrate various fill tube cross sections.
Figure 11B:
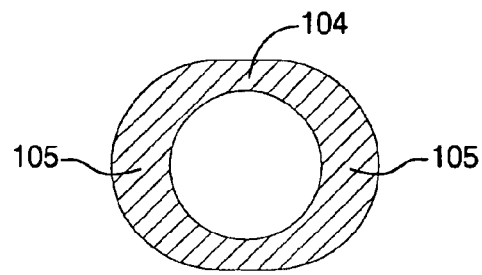
Figure 11C:
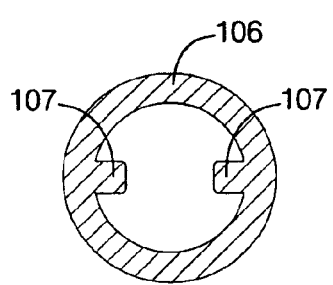
Figure 11D:
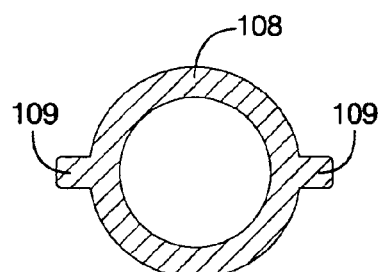

Regardless of whether a straight or curved fill tube is employed, there are several fill tube cross-section options shown in FIGS. 11A–D. A fill tube with a uniform cross-section 102 may be used and is likely the low cost option. If additional lateral strength is required to resist fill tube deformation in side impact events or if the fill tube is too heavy and weight must be reduced, other cross-sections may be used. A fill tube cross-section 104 with strength elements 105 in its walls may be used, as shown in FIG. 11B. A fill tube cross-section 106 with male protrusion strength elements 107 on its inner wall, as shown in FIG. 11C or fill tube cross section 108 with male protrusion strength elements 109 on its outer wall may be used as shown in FIG. 11D.

Figure 12A:
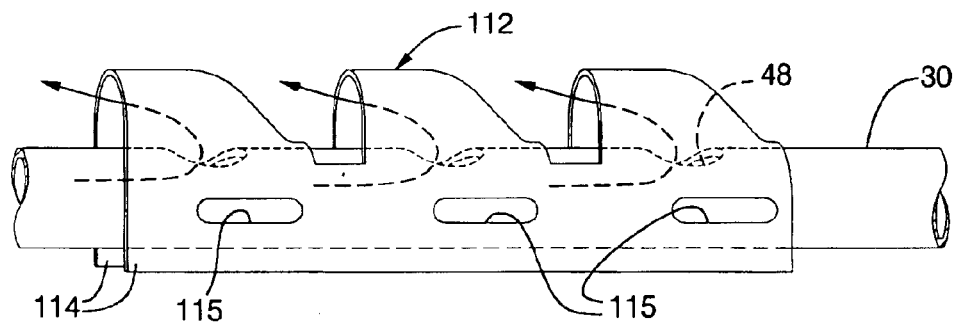
FIG. 12A illustrates a rigid diffuser with reinforcements.
Figure 12B:
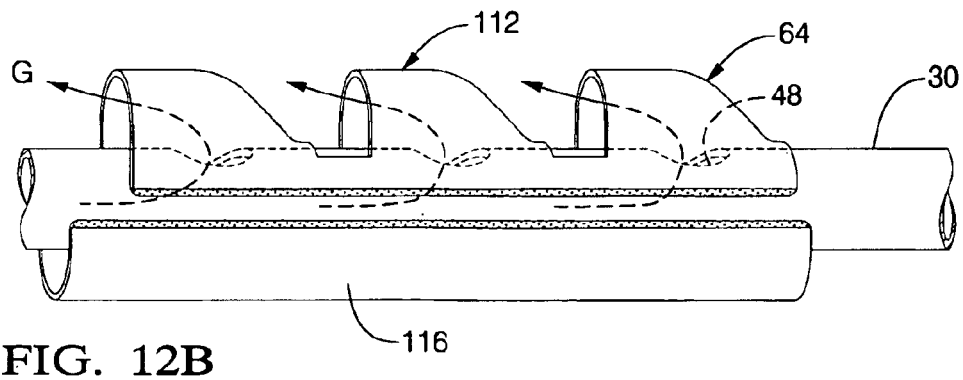
FIG. 12B illustrates a fill tube with reinforcement.

Beyond what may be accomplished with strengthening the fill tube itself, the fill tube 30 may require additional reinforcement so that the fill tube does not bend due to deployment generated loads at the radial openings 48. Additional structure may be included on the rigid diffuser. In one configuration shown in FIG. 12A, the rigid diffuser 112 has lower reinforcement extensions 114 and is welded to the fill tube 30 in the slots 115. Other diffuser shapes may be used. Or a discrete tube reinforcement 116, as shown in FIG. 12B, that is welded to the fill tube 30 or to the diffuser (not shown) may be employed.

Figure 13A:
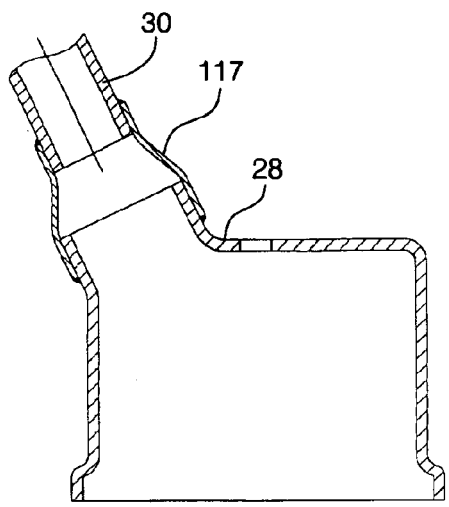
FIGS. 13A–B illustrate a pinch resistant connector between the plenum and fill tube.
Figure 13B:
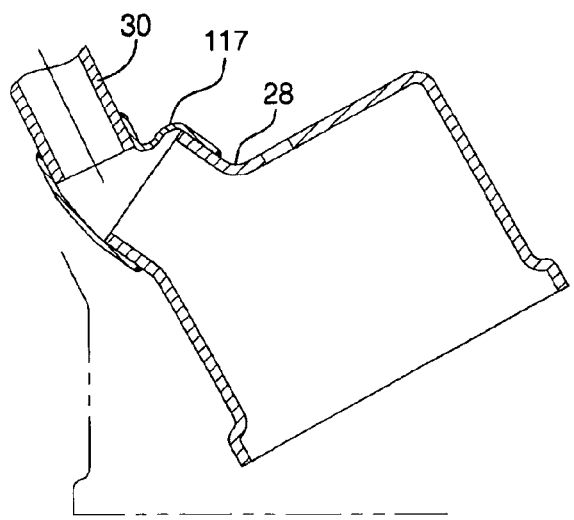
Figure 14:
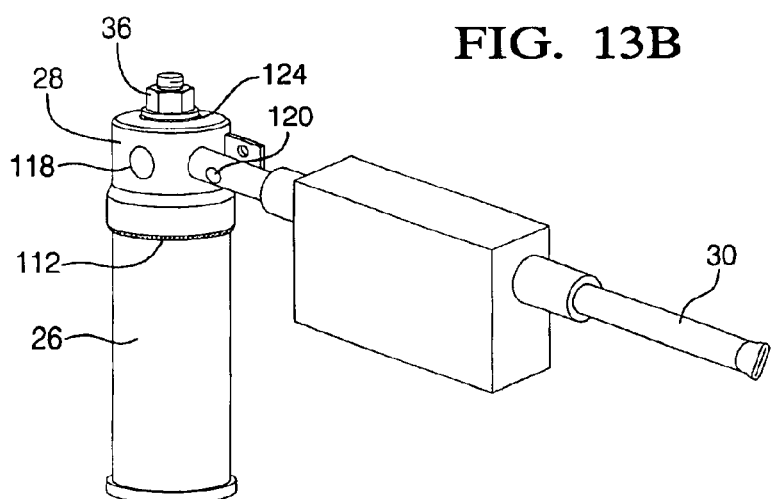
FIG. 14 illustrates the frontal air bag system with pressure relief features.

As to the interface between the plenum 28 and the fill tube 30, it may be desirable to include a pinch resistant connector 117 therebetween as shown in FIGS. 13A and B. The pinch resistant connector 117 would help to maintain an open flow path from the plenum 28 to the fill tube 30 even if there is relative displacement between the plenum/inflator and the fill tube prior to deployment of the frontal air bag system. In the event that gas flow to the cushion is interrupted during deployment, a pressure relief device near the inflator 26 may be provided so that inflator gases may escape if the system reaches a predetermined pressure level. FIG. 14 illustrates several different methods to achieve a pressure relief device.

A burst disk or thinned out section 118,120 may be located on the plenum 28 or the fill tube 30 respectively. These elements would open if pressure due to inflation gases exceeds the operating pressure of the system during normal deployment, causing the inflation gases to exit the system to outside atmosphere.

A seal/crushable element 122,124 may be placed between the inflator 26 and plenum 28 or between the plenum and the plenum nut 36 respectively. These elements would deform if pressure due to inflation gases exceeds the operation pressure of the system during normal deployment, causing the inflation gases to exit the system to outside atmosphere at the seal/crushable element 122,124 location or the location between the inflator 26 and the plenum 28.

Figure 3B:
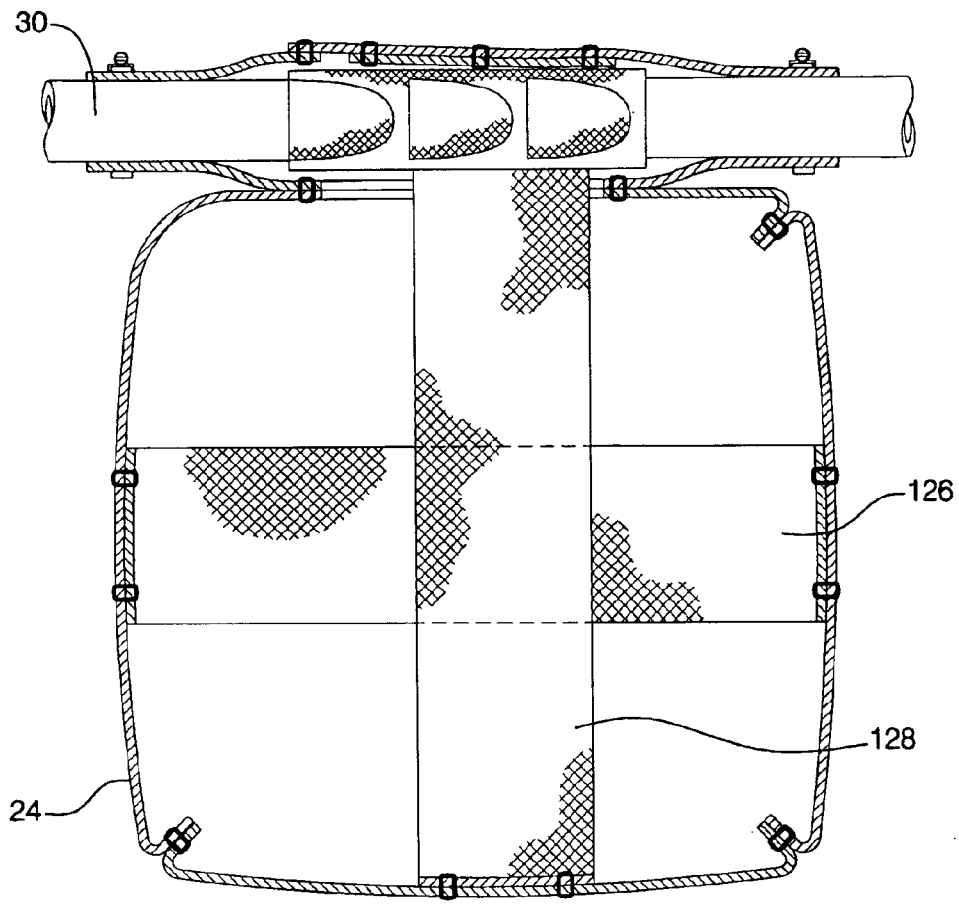
FIG. 3B is a plan view cross section of the deployed cushion of the frontal air bag system of FIG. 3A.

As illustrated in FIG. 3B, the cushion 24 may have internal tethers shown here with a fore/aft tether 126 and a lateral tether 128, for controlling the shape of the deploying cushion. Obviously other orientations beyond that shown in FIG. 3B may be used. The tethers may be attached to the cushion, the fill tube, or the rigid diffuser. The cushion may also have vents 130.

The air bag module may also have a fabric flap 132, which upon deployment of the cushion 24 is disposed adjacent a rearward portion of the deployed cushion. The fabric flap 132 creates a slip plane between the cushion 24 and the passenger so that the cushion may fully inflate with minimal interaction with the passenger.

Now with reference back to FIG. 2, the discussion will turn to the passenger side door 20 in which the air bag system 22 is packaged. The passenger side door 20 is constructed of a door outer panel 140, a door inner panel or structure 142, and a trim panel 144 covering the door inner panel as an interior show surface. The frontal air bag system 22 is received within a module housing 146 which may actually be several housings. The module housing 146 is received within a recess or cut-out 148 in the door inner panel 142. The trim panel 144 covers the door inner panel 142 and air bag system 22. The recess 148 in the door inner panel 142 may be sufficiently deep to accommodate the frontal air bag system 22 so that the trim panel 144 is generally a flush surface. If not, the trim panel may have convex surfaces for the inflator and module respectively. The instrument panel would then include a corresponding concave surface in which the convex surface on the trim panel would rest when the vehicle door is closed. In an alternative packaging scheme the instrument panel and the vehicle door may have an interface that is located inboard to accommodate packaging the inflator.

Figure 15A:
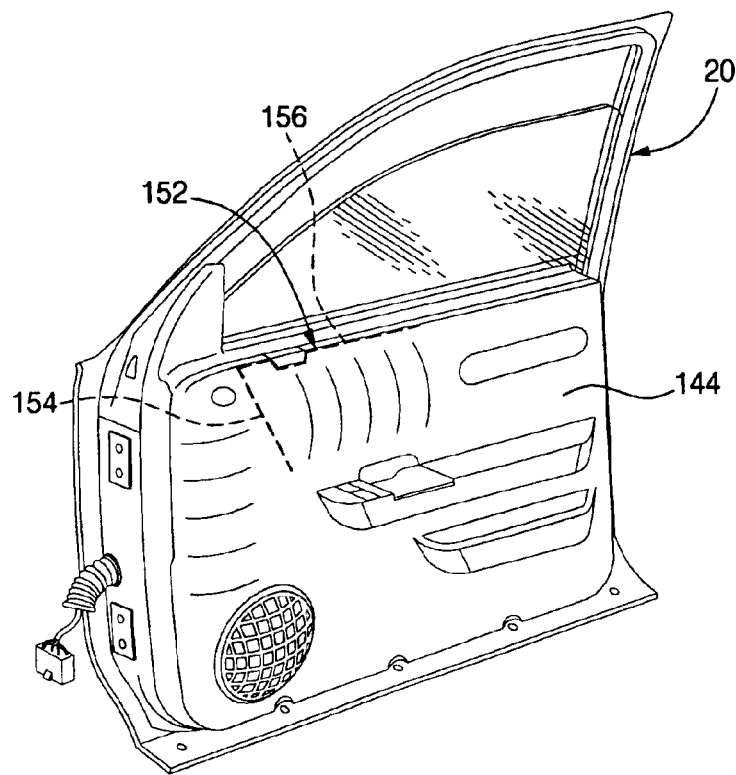
FIG. 15A illustrates a door trim panel having a sideways L shaped tear pattern.
Figure 15B:
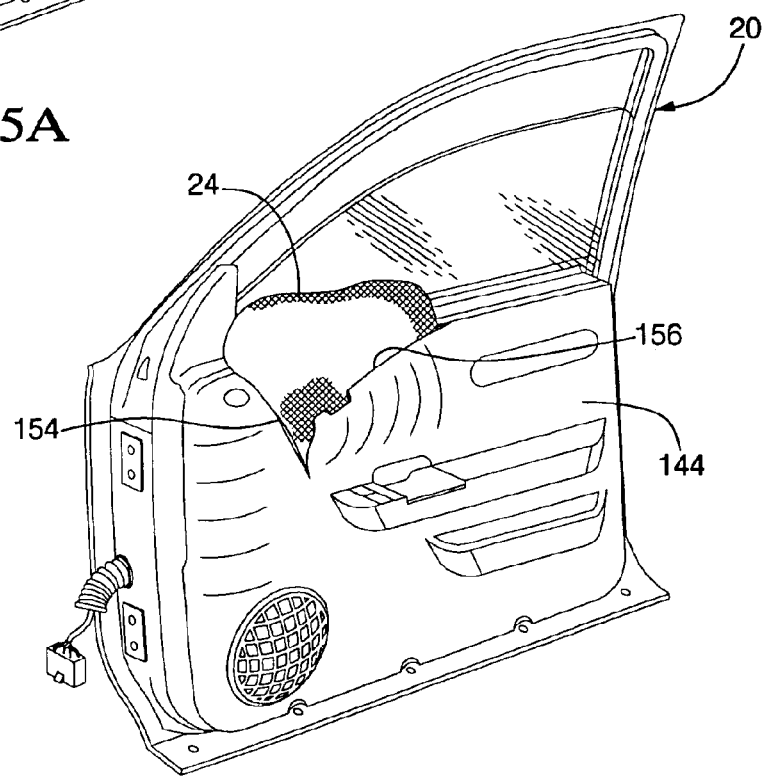
FIG. 15B illustrates the cushion deploying through the tear pattern of FIG. 15A.
Figure 16A:
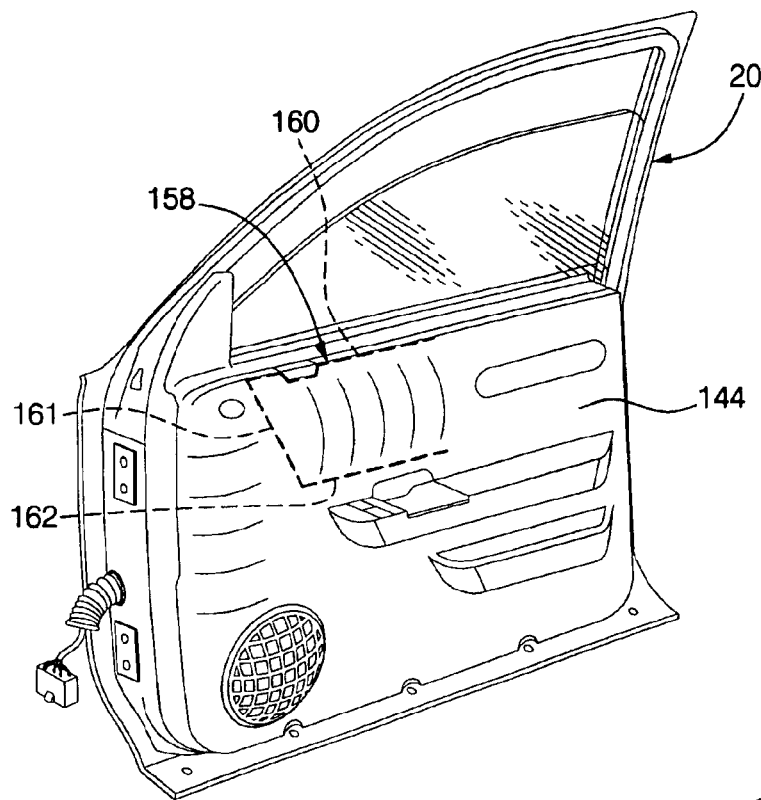
FIG. 16A illustrates a door trim panel having an elongated C shaped tear pattern.
Figure 16B:
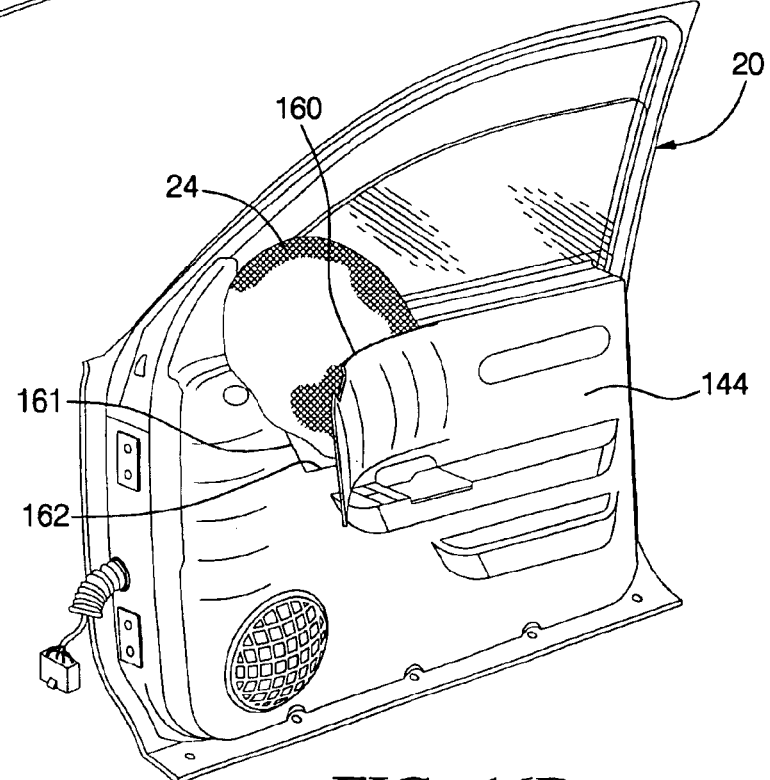
FIG. 16B illustrates the cushion deploying through the tear pattern of FIG. 16A.
Figure 17A:
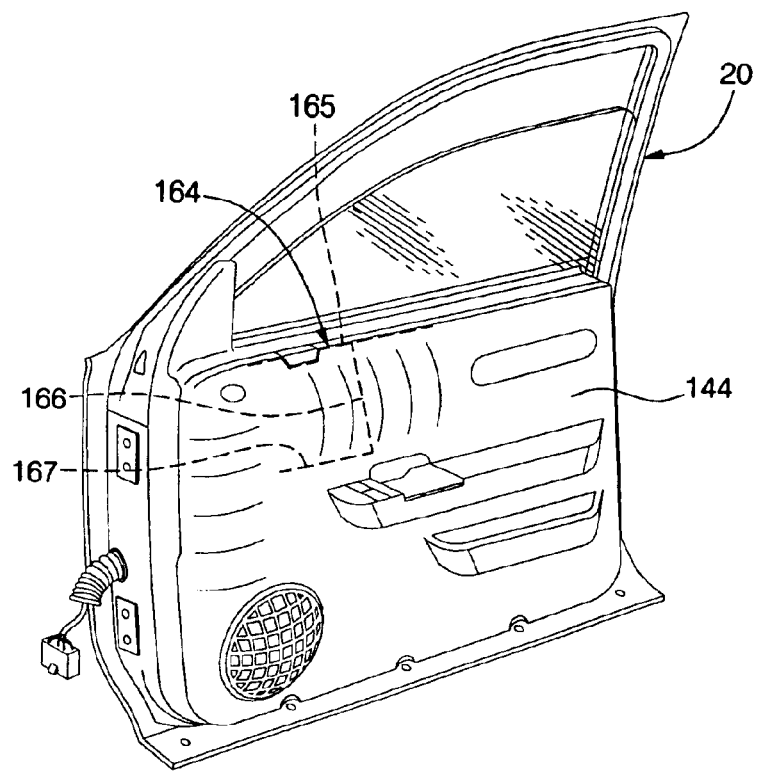
FIG. 17A illustrates a door trim panel having a sideways h shaped tear pattern.
Figure 17B:
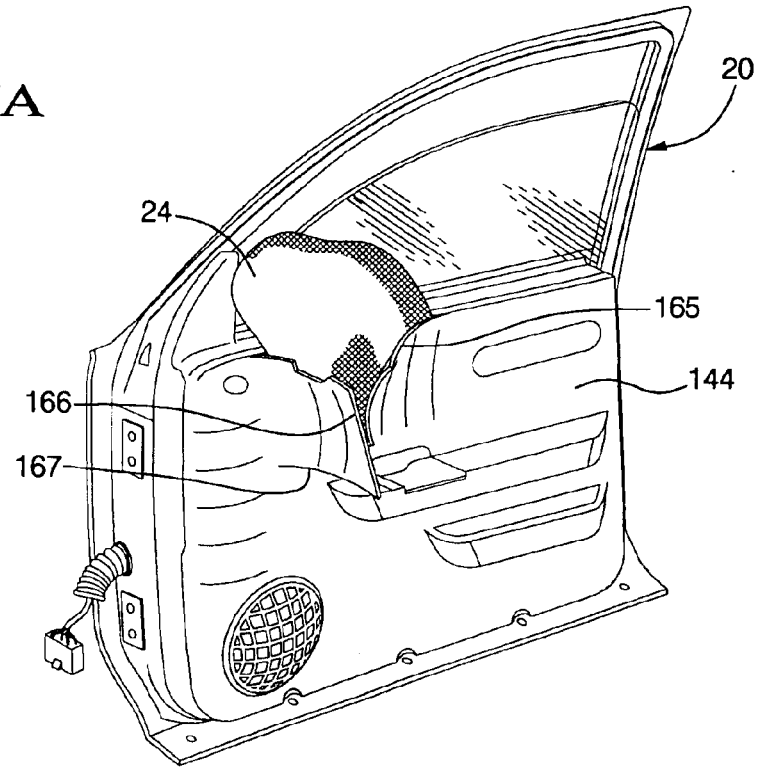
FIG. 17B illustrates the cushion deploying through the tear pattern of FIG. 17A.

The door trim panel 144 may include an integral air bag deployment door 150, through which the cushion deploys into the interior of the vehicle. Several different deployment door opening patterns may be used where the pattern is defined by either a seam of weakened material or an outer edge of the door trim panel. In FIGS. 15A,B, a sideways "L" shaped pattern 152 is shown and is preferred with its forward vertical seam 154 and adjacent upper seam or edge 156 for deploying the cushion in a forward manner. In FIGS. 16A,B, an elongated C-shaped pattern 158 is employed with its forward vertical seam 161 and adjacent upper seam or edge 160 and adjacent lower seam 162 extending horizontally rearward from each end of the vertical seam 161. In FIGS. 17A,B, a sideways "h" shaped pattern 164 is shown having an upper horizontal seam or edge 165, a vertical seam 166 extending downward from an intermediate location along the upper horizontal seam or edge, and a lower horizontal seam 167 extending forwardly from a lower end of the vertical seam.

The edges of the deployment door 150 that open to release the cushion may be completely hidden from view prior to deployment or may be visible. Instead of an integral deployment door, a separate deployment door may be used and packaged within the trim panel of the vehicle door and attached to the air bag module.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A vehicle having a passenger air bag system for frontal impact restraint, comprising:
    a vehicle body defining a vehicle interior space therein;
    a passenger seat located within the interior space;
    a side vehicle door adjacent the passenger seat;
    the passenger air bag system packaged within the vehicle door comprising a gas emitting inflator for emitting inflation gas upon receiving a signal of a frontal impact, a fill tube having a first, fill end in fluid communication with the inflator to port the inflation gas from the inflator, and an air bag module in fluid communication with the fill tube and having an air bag cushion packed therein to receive the inflation gas from the fill tube and deployable in the interior space forward of the passenger seat upon the frontal impact; wherein the fill tube has a straight portion having radial openings disposed within the air bag cushion, further including a diffuser packaged inside the cushion and circumjacent to the fill tube and having ports aligned with the radial openings in the fill tube to redirect gas generally forward in the cushion.

2. A vehicle having a passenger air bag system for frontal impact restraint, as defined in claim 1, wherein the difusser is a rigid component.

3. A vehicle having a passenger air bag system for frontal impact restraint, as defined in claim 2, wherein the diffuser is reinforceably attached to the fill tube to provide reinforcement to the fill tube.

4. A vehicle having a passenger air bag system for frontal impact restraint, as defined in claim 1, wherein the diffuser is flexible and expandable to open the ports upon inflation.

5. A vehicle having a passenger air bag system for frontal impact restraint, as defined in claim 1, wherein the ports are angled forward more than 90 degrees from a rearward fill tube gas flow direction.

* * * * *